US012616918B2

(12) United States Patent
Gebauer et al.

(10) Patent No.: US 12,616,918 B2
(45) Date of Patent: May 5, 2026

(54) CONNECTION DEVICE FOR A SEPARATION SYSTEM SUCH AS A CHROMATOGRAPHY SYSTEM

(71) Applicant: Cytiva Sweden AB, Uppsala (SE)

(72) Inventors: Klaus Gebauer, Uppsala (SE);
Andreas Lundin, Uppsala (SE);
Fredrik Lundström, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 936 days.

(21) Appl. No.: 17/268,497

(22) PCT Filed: Aug. 20, 2019

(86) PCT No.: PCT/EP2019/072307
§ 371 (c)(1),
(2) Date: Feb. 15, 2021

(87) PCT Pub. No.: WO2020/043557
PCT Pub. Date: Mar. 5, 2020

(65) Prior Publication Data
US 2021/0162317 A1     Jun. 3, 2021

(30) Foreign Application Priority Data

Aug. 31, 2018     (GB) ..................................... 1814213

(51) Int. Cl.
*B01D 15/18*          (2006.01)
*G01N 30/20*          (2006.01)
(Continued)

(52) U.S. Cl.
CPC ............. *B01D 15/18* (2013.01); *G01N 30/20* (2013.01); *G01N 30/38* (2013.01); *G01N 30/468* (2013.01); *G01N 2030/205* (2013.01)

(58) Field of Classification Search
CPC ........... G01N 2030/205; G01N 30/468; G01N 30/461; G01N 30/466; G01N 2030/8881;
(Continued)

(56) References Cited

U.S. PATENT DOCUMENTS 5,906,223  A       5/1999  Pinkham
6,261,458  B1      7/2001  Callebert et al.
(Continued)

FOREIGN PATENT DOCUMENTS

CN          101489636  A      7/2009
CN          105980026  A      9/2016
(Continued)

OTHER PUBLICATIONS

PCT International Search Report and Written Opinion for PCT/EP2019/072307 mailed Nov. 29, 2019 (11 pages).
(Continued)

*Primary Examiner* — Pranav N Patel
(74) *Attorney, Agent, or Firm* — Eversheds-Sutherland (US) LLP

(57) ABSTRACT

A connection device (1; 101) configured for connecting a separation system (3) with a separation device (5), wherein a fluid can be flowed from a separation system outlet connection (19), through a bypass fluid path (27) of the connection device to the separation system inlet connection (15) while a connected separation device (5) is by passed. For achieving this at least one of an inlet and an outlet valve (31, 33) provided in the connection device is provided in a closed state and at least one bypass valve (35; 35*a*, 35*b*) provided in the connection device is provided in an open state.

21 Claims, 11 Drawing Sheets

(51) Int. Cl.
   *G01N 30/38*     (2006.01)
   *G01N 30/46*     (2006.01)

(58) Field of Classification Search
   CPC .............. G01N 30/38; G01N 30/6034; G01N
                2030/385; G01N 2030/8804; G01N
                30/20; B01D 15/1864; B01D 2313/105;
                B01D 2201/16; B01D 15/18; B01D 15/10
   See application file for complete search history.

(56)                 References Cited

U.S. PATENT DOCUMENTS

| | | | | |
|---|---|---|---|---|
| 10,843,186 | B1 * | 11/2020 | Ballew | ..................... B01L 9/06 |
| 2010/0282994 | A1 | 11/2010 | Moldenhauer et al. | |
| 2015/0041009 | A1 * | 2/2015 | Gebauer | ............... F16K 15/148 |
| | | | | 137/606 |
| 2015/0336026 | A1 * | 11/2015 | Almeida | ................ G01N 30/26 |
| | | | | 137/15.05 |
| 2016/0319955 | A1 * | 11/2016 | Gebauer | ................ C12M 41/40 |
| 2017/0241243 | A1 * | 8/2017 | Gomes Martins | ...... E21B 43/01 |
| 2017/0304519 | A1 * | 10/2017 | Jonas | .................... A61M 1/167 |
| 2020/0276372 | A1 * | 9/2020 | Milad | ................. A61M 1/1565 |

FOREIGN PATENT DOCUMENTS

| | | |
|---|---|---|
| CN | 205785303 U | 12/2016 |
| CN | 108037233 A | 5/2018 |
| JP | S60188844 A | 9/1985 |
| JP | 2001096136 A | 4/2001 |
| JP | 2009519440 A | 5/2009 |
| JP | 2013527473 A | 6/2013 |
| WO | 2003/026772 A2 | 4/2003 |
| WO | 2006101046 A1 | 9/2006 |
| WO | 2006101114 A1 | 9/2006 |
| WO | WO-2016107809 A1 * | 7/2016 ......... B01D 15/1842 |

OTHER PUBLICATIONS

Great Britain Search Report for GB Application No. 1814213.3 mailed Jan. 23, 2019 (3 pages).

Chin et al., "Simulated Moving Bed Equipment Designs," Separation and Purification Reviews, 2004, 33(2):77-155.

Faria et al., "Instrumental Aspects of Simulated Moving Bed Chromatography," Journal of Chromatography A, 2015, 1421:82-102.

Chin et al., "Simulated Moving Bed Equipment Designs," Separation and Purification Reviews, 2004, 33(2): pp. 77-155.

Japanese Office Action for JP Application No. 2021-510841, mailed Apr. 10, 2023 (6 pages, with English translation).

Chinese Office Action for CN Application No. 201980056981.2, mailed Nov. 27, 2023 (15 pages, with English translation).

Song Hua, "Fuming, New Continuous Preparative Chromatography for Multi-Component Separation: Array Column Chromatography", Chemical Industry and Engineering, No. 2, Apr. 25, 2005.

Chinese Search Report for CN Application No. 201980056981.2, mailed Nov. 22, 2023 (10 pages, with English translation).

* cited by examiner

1'

CONNECTION DEVICE FOR A SEPARATION SYSTEM SUCH AS A CHROMATOGRAPHY SYSTEM

CROSS REFERENCE TO RELATED APPLICATIONS

This application claims the priority benefit of PCT/EP2019/072307, filed on Aug. 20, 2019, which claims the benefit of Great Britain Application No. 1814213.3, filed on Aug. 31, 2018, the entire contents of which are incorporated by reference herein.

TECHNICAL FIELD OF THE INVENTION

The present invention relates to a connection device for connecting a separation device to a separation system, such as for example a chromatography column to a chromatography system. It also relates to a chromatography column and to a separation system such as a chromatography system.

RELATED ART

Pre-packed chromatography columns are important separation devices in biopharmaceutical manufacturing. They may be used for manufacturing multiple drug products and thus be used in different processes, however, preferably they are used for manufacturing exclusively a single biopharmaceutical drug product to avoid the need for extensive cleaning and sanitization arising from the risk for cross-contamination when using the same column for producing different drug products. Pre-packed columns are therefore often used as single-use columns and used with other single-use technology products, such as single-use flow paths in chromatography systems and single-use fluid storage bags, single-use tubing etc.

As described, the advantage of using single-use technology (SUT) fluid handling equipment is primarily that cross-contamination in between production batches and campaigns is reduced or completely eliminated when the SUT equipment is used for a single drug product only. The SUT equipment is disposed of after use, which can be after a single run, batch or campaign comprising multiple runs and batches. When providing SUT equipment pre-sterilized or bioburden controlled, initial cleaning and sanitization (for example by contacting the flow path with sodium hydroxide solutions) or sterilization can be avoided. When using the SUT for a single run or batch only, even cleaning post-use may be omitted. With these features, SUT equipment provides improved efficiency, safety and convenience.

However, regardless of using a pre-packed column for a single drug product only or for multiple drug products, there is typically a need to use the same column in multiple production runs, batches and production campaigns, primarily for reasons of cost. Thus, disconnecting and re-connecting the column to a chromatography system, or to different SUT flow paths of a chromatography system, that is providing and controlling the fluid flow over the column, is typically required in between said multiple production batches and/or production campaigns, and the column may be stored prior to re-connecting the column to the same or a different chromatography system or different flow paths.

To allow for use of columns in multiple batches and production campaigns, these columns and/or the separation system(s) are often fitted with stainless steel valves at the interface of column and system to allow to close off the column during storage and to connect the column later to a chromatography system and use of the column for a subsequent production run. These stainless steel valves however require cleaning and sanitization and are costly when used for a single column and biopharmaceutical product only.

SUMMARY

An object of the invention is to provide a connection device for connecting a separation device to a separation system, such as for example a chromatography column to a chromatography system or to provide a separation device or a separation system comprising such a connection device which is facilitating easy connection, disconnection and/or, re-connection of device and system, and improving sanitization possibilities.

A further object of the invention is to provide a connection device for connecting a separation device to a separation system or to provide a separation device or a separation system comprising such a connection device which is facilitating connection, disconnection and/or, re-connection of separation device and system, and facilitating removal of air in connections between the separation device and system without flushing air through the separation device, which is improving sanitization possibilities and efficiency in using the separation device and system.

A further object of the invention is to provide a cost efficient connection device suitable for adaption to pre-packed chromatography columns and/or single-use chromatography columns as well as single-use systems which are used only for a limited number of drug products and/or production runs.

This is achieved by a connection device and a separation device and a separation system according to the independent claims.

According to one aspect of the invention a connection device is provided configured for connecting a separation system with a separation device, said connection device comprising:

- a separation device inlet connection configured for connection to a separation device inlet;
- a separation device outlet connection configured for connection to a separation device outlet;
- a separation system inlet connection configured for connection to a separation system inlet;
- a separation system outlet connection configured for connection to a separation system outlet;
- a first fluid path connecting the separation system inlet connection with the separation device outlet connection;
- a second fluid path connecting the separation system outlet connection with the separation device inlet connection;
- a bypass fluid path connecting the separation system inlet connection with the separation system outlet connection;
- an inlet valve provided in the second fluid path in connection with the separation device inlet connection, said inlet valve being operable to provide an open state allowing fluid flow through the separation device inlet connection and a closed state preventing fluid flow through the separation device inlet connection;
- an outlet valve provided in the first fluid path in connection with the separation device outlet connection, said outlet valve being operable to provide an open state allowing fluid flow out through the separation device outlet connection and a closed state preventing fluid flow through the separation device outlet connection; and at least one bypass valve provided in the bypass fluid path, said at least one bypass valve being operable to provide an open state allowing fluid flow through the bypass fluid path and a closed state preventing fluid flow through the bypass fluid path, wherein a fluid can be flowed from the separation system outlet connection, through the bypass fluid path to the separation system inlet connection while a connected separation device is bypassed when at least one of the inlet and outlet valves is provided in a closed state and the at least one bypass valve is provided in an open state.

According to another aspect of the invention a separation device is provided comprising a separation device inlet and a separation device outlet and a connection device according to the invention connected to the separation device inlet and the separation device outlet.

According to another aspect of the invention a separation system is provided comprising a separation system inlet and a separation system outlet and a connection device according to the invention connected to the separation system inlet and the separation system outlet.

Hereby, with a bypass fluid path, connecting the separation system inlet connection with the separation system outlet connection and valves controlling the fluid flow through the separation device and through the bypass fluid, the removal of air introduced to the fluid path when establishing the connection and the sanitization of the connections between the separation device and the separation system can be provided without the need to flush through the separation device, such as for example the chromatography bed. The chromatography bed may already have been sanitized after a previous run and omitting the flushing of air, additional sanitization liquid as well as flushing potential contaminants from the inlet connection to the outlet connection increases process and product safety, operational efficiency and reduces overall complexity and time requirements. Furthermore, the inlet and outlet valves can close off the column for storage between different production campaigns. Hereby an easily handled separation device, such as a chromatography column is provided which can be stored, reused and sanitized in an efficient way. Furthermore, air can be removed via the bypass fluid path without the need to pass air thought the chromatography bed, which would be a time consuming operation, may compromise the integrity of the bed and require an additional sanitization of the bed after flushing out the air. The connection device may be provided with aseptic connectors in between connection device and separation system, and/or in between connection device and separation device to efficiently prevent contamination during connections and provide the possibility to remove air introduced during establishing of the connections through the bypass without the need of flushing air through the bed.

The connection device can suitably be pre-sterilized, for example by gamma irradiation or autoclaving to further reduce the risk for contamination. When provided pre-sterilized and with aseptic connectors, the connection device and/or the connected assembly of connection device, separation device and/or separation system and i.e. its flow path may not require cleaning and sanitization at all prior to use.

In one embodiment of the invention the at least one bypass valve is of diaphragm type.

In one embodiment of the invention said bypass valve is positioned in the bypass fluid path at a distance from the first and/or second fluid path of no more than 3 times, or 2 times or 1 times a diameter of the first, the second and/or the bypass fluid path.

In one embodiment of the invention said inlet and outlet valves are of diaphragm type.

In one embodiment of the invention the inlet and outlet valves are positioned at a distance from junctions in between the first and second fluid paths and the bypass fluid path, of no more than 3 times, or 2 times, or 1 times a diameter of the first, the second and/or the bypass fluid line.

In one embodiment of the invention the connection device is pre-sterilized and the separation device inlet and outlet connections are provided with aseptic connectors.

In one embodiment of the invention it is pre-sterilized and the separation system inlet and outlet connections are provided with aseptic connectors.

In one embodiment of the invention said inlet valve, said outlet valve and said at least one bypass valve are manually controllable into open and closed states.

In one embodiment of the invention it comprises at least one monitoring device which is connected to the inlet valve, the outlet valve and/or to the at least one bypass valve and which monitoring device shows the states of the inlet valve, the outlet valve and the at least one bypass valve.

In one embodiment of the invention the connection device further comprises at least one sensor arranged in the connection device for detecting an open and/or closed state of at least one of the inlet valve, the outlet valve or the at least one bypass valve.

In one embodiment of the invention it comprises a combination control device which is connected to both the inlet valve, the outlet valve and to the at least one bypass valve and which in a first position controls the inlet valve and the outlet valve to be in open states and the at least one bypass valve to be in a closed state and which in a second position controls the inlet valve and the outlet valve to be in closed states and the at least one bypass valve to be in an open state.

In one embodiment of the invention the connection device comprises one bypass valve and wherein said inlet valve said outlet valve and said bypass valve are provided together in one valve assembly part.

In one embodiment of the invention the connection device comprises a first and a second bypass valve and wherein the connection device comprises an inlet valve assembly part comprising the inlet valve and the second bypass valve and an outlet valve assembly part comprising the outlet valve and the first bypass valve, wherein said bypass fluid path is provided between the first and the second bypass valves.

In one embodiment of the invention the separation device is a chromatography column.

In one embodiment of the invention the separation device is pre-packed with a bed of chromatography media.

In one embodiment of the invention the connection device) is connected to the separation device inlet and the separation device outlet through barbed connections, Bar-block connections, TC connections or welded connections.

In one embodiment of the invention said connection device is integral with the separation device.

In one embodiment of the invention said bypass fluid path is provided integral with an end unit of the separation device.

In one embodiment of the invention said separation device is pre-sterilized and wherein said separation system inlet and outlet connections of the connection device are provided with aseptic connectors.

In one embodiment of the invention the connection device is connected to the separation system inlet and the separation system outlet through barbed connections, Barblock connections, TC connections or welded connections.

In one embodiment of the invention said connection device is integral with the separation system.

BRIEF DESCRIPTION OF THE DRAWINGS

FIG. 2b is a perspective view of a part of the same connection device as shown in FIG. 2a.

FIG. 2c is a cross section of a part of the same connection device as shown in FIG. 2a.

DETAILED DESCRIPTION OF EMBODIMENTS

Figure 1A:
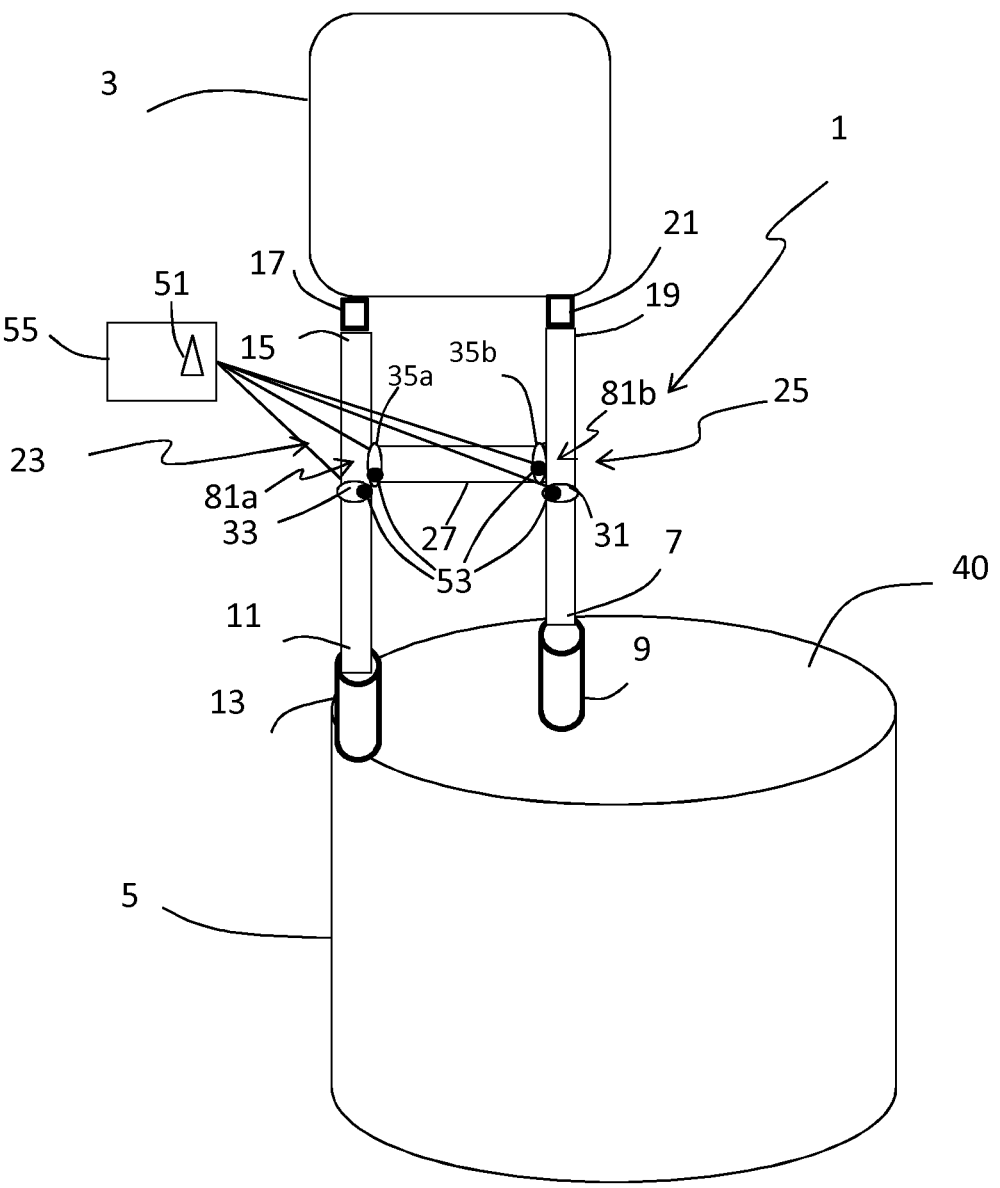
FIG. 1a shows schematically a connection device according to one embodiment of the invention connecting a separation system with a separation device.

FIG. 1a shows schematically a connection device 1 according to one embodiment of the invention connecting a separation system 3 with a separation device 5. The connection device 1 according to the invention can for example be used for connecting a chromatography system with a chromatography column but can also be used for connecting another type of chromatographic separation device to a separation system, such as any type of fixed bed format facilitating chromatographic separation capabilities, such as beds comprising beaded porous structures, membranes and/or membrane adsorbers, monolithic structures, filters, fiber based structures and/or hybrid structures. In the rest of the detailed description an example with chromatography system and chromatography column is however mainly referred to. The connection device 1 can according to the invention be a separate part which is connected to the separation device 5 (also called chromatography column 5) and the separation system 3 (also called a chromatography system 3) by for example TC (Tri-Clamp) connections or Barblock (St Gobain) connections which ensure efficient sanitization. If the connection device is provided pre-sterilized and does not require subsequent sanitisation, conventional barbed connections could be employed as well, i.e. for connections internal to the connection device.

However, according to another embodiment of the invention the connection device 1 or some parts of the connection device could instead be an integrated part of the separation device (chromatography column). In a further embodiment of the invention, the connection device 1 or some parts of the connection device could instead be an integrated part of the separation system. In a further embodiment of the invention, the connection device 1 or some parts of the connection device could instead be an integrated part of a flow kit.

Depending on the embodiment, the degree of and utilization of features and improvements provided by the connection device according to the invention may vary.

The separation device 5 (chromatography column) can comprise for example a bed of packed beads, a monolith or modified membranes. The separation device 5 can be prepacked with a bed of chromatography media. The connection device 1 according to the invention allows the separation device to be connected to a separation system 3. The connection device 1 comprises a separation device inlet connection 7 configured to be connected to a separation device inlet 9 of the separation device 5. Furthermore the connection device 1 comprises a separation device outlet connection 11 configured to be connected to a separation device outlet 13 of the separation device 5. These connections could for example be TC connections or Barblock connections. However in another embodiment, where the connection device 1 is integrated with the separation device 5, the separation device outlet connection 11 of the connection device could instead be integrated with the separation device outlet 13 and the separation device inlet connection 7 of the connection device could be integrated with the separation device inlet 9, hereby not requiring specific connectors. Different configurations are possible, for example the separation device outlet 13 could be positioned at the bottom side of the column and adjacent to the outlet side of the bed, respectively, and the separation device outlet connection 11 of the device could accordingly be integrated with 13 at the bottom or the bed and column. Other configurations are feasible, also for positioning other elements of the connection device or for connecting and/or integrating connections between column and connection device, as for example connections at the side of the column or at the side of the system.

The connection device 1 comprises further a separation system inlet connection 15 and a separation system outlet connection 19 configured to be connected to a separation system inlet 17 and a separation system outlet 21 respectively of a separation system 3. These connections could as described above be for example TC connections or Barblock connections. In one embodiment of the invention, the connection device 1 or parts of the connection device 1 is integrated with the separation system 3. In this embodiment the separation system outlet connection 19 of the connection device can be integrated with the separation system outlet 21 and the separation system inlet connection 15 of the connection device can be integrated with the separation system inlet 17, hereby not requiring specific connectors.

Furthermore the connection device 1 comprises a first fluid path 23 connecting the separation system inlet connection 15 with the separation device outlet connection 11 and a second fluid path 25 connecting the separation system outlet connection 19 with the separation device inlet connection 7. The first and second fluid paths 23, 25 can be provided as individual flexible, plastic tubes, as flexible plastic tubes comprised in a tubing harness or guide device providing a higher degree of order and rigidity, or as conduits integrated in a (semi-)rigid plastic block.

According to the invention the connection device 1 further comprises a bypass fluid path 27 connecting the separation system inlet connection 19 with the separation system outlet connection 19 via parts of the first and second fluid paths 23, 25. I.e. the bypass fluid path 27 is in this embodiment provided such that it connects the first fluid path 23 with the second fluid path 25 at a position of the first and second fluid paths 23, 25 being in between the separation device inlet/outlet connections and the separation system inlet/outlet connections. The bypass fluid path 27 can be provided as a flexible, plastic tube, as a flexible plastic tube comprised in a tubing harness or guide device providing a higher degree of order and rigidity, or as a conduit integrated in a (semi-)rigid plastic block. In one embodiment of the invention the bypass fluid path 27 can also be integrated in an end unit 40 of the separation device 5.

Furthermore an inlet valve 31 is provided in the second fluid path 25 in connection with the separation device inlet connection 7. Said inlet valve 31 is operable to provide an open state allowing fluid flow through the separation device inlet connection 7 and a closed state preventing fluid flow through the separation device inlet connection 7. An outlet valve 33 is provided in the first fluid path 23 in connection with the separation device outlet connection 11. Said outlet valve 33 is operable to provide an open state allowing fluid flow out through the separation device outlet connection 11 and a closed state preventing fluid flow through the separation device outlet connection 11. The bypass fluid path 27 is connected to the first and second fluid paths 23, 25 respectively at a position in between the separation system inlet/outlet connections 15, 19 and the inlet/outlet valves 31, 33. The inlet/outlet valves 31, 33 allowing for closing off the bed are suitably positioned close to junctions 81a, 81b in between the first and second fluid paths 23, 25 and the bypass fluid path 27 to avoid any deadlegs that may cause difficulties in flushing out fluid efficiently. The deadleg in between the inlet and outlet valves 33, 31 and the fluid junctions 81a, 81b to the bypass line 27 is preferably less than 3 times the diameter or less than 2 times or less than 1 times the diameter of the fluid paths 23, 25 and/or 27.

According to the invention at least one bypass valve is provided in the bypass fluid path 27. Said at least one bypass valve is operable to provide an open state allowing fluid flow through the bypass fluid path 27 and a closed state preventing fluid flow through the bypass fluid path 27. In the embodiment of the invention as shown in FIG. 1a two bypass valves 35a, 35b are provided in the bypass fluid path 27. A first bypass valve 35a is provided close to the first fluid path 23 and a second bypass valve 35b is provided close to the second fluid path 25. Close may be for example a distance which is less than 3 times a diameter of the fluid paths 23, 25 and/or 27 or less than 2 times the diameter or less than 1 times the diameter.

Hereby a fluid can be flowed from the separation system outlet connection 19, through the bypass fluid path 27 to the separation system inlet connection 15 while a connected separation device 5 is bypassed when at least one of the inlet and outlet valves 31, 33 is provided in a closed state and the at least one bypass valve 35a, 35b is provided in an open state. Hereby air can be removed via the bypass fluid path 27 without the need to pass air thought the chromatography bed. Furthermore the separation system inlet and outlet connections 15, 19 and the parts of the first and second fluid paths 23, 25 and the bypass fluid path 27 can be sanitized. By providing the bypass valves 35a, 35b close to the first and second flow paths 23, 25 and possibly also close to the inlet and outlet valves 31, 33 dead legs are avoided where fluid could get trapped such that it cannot be flushed out efficiently. Hereby, also a good sanitization of the connection device can be provided between uses when applying sanitization agents for bioburden reduction and control, such for example sodium hydroxide solutions.

Figure 1B:
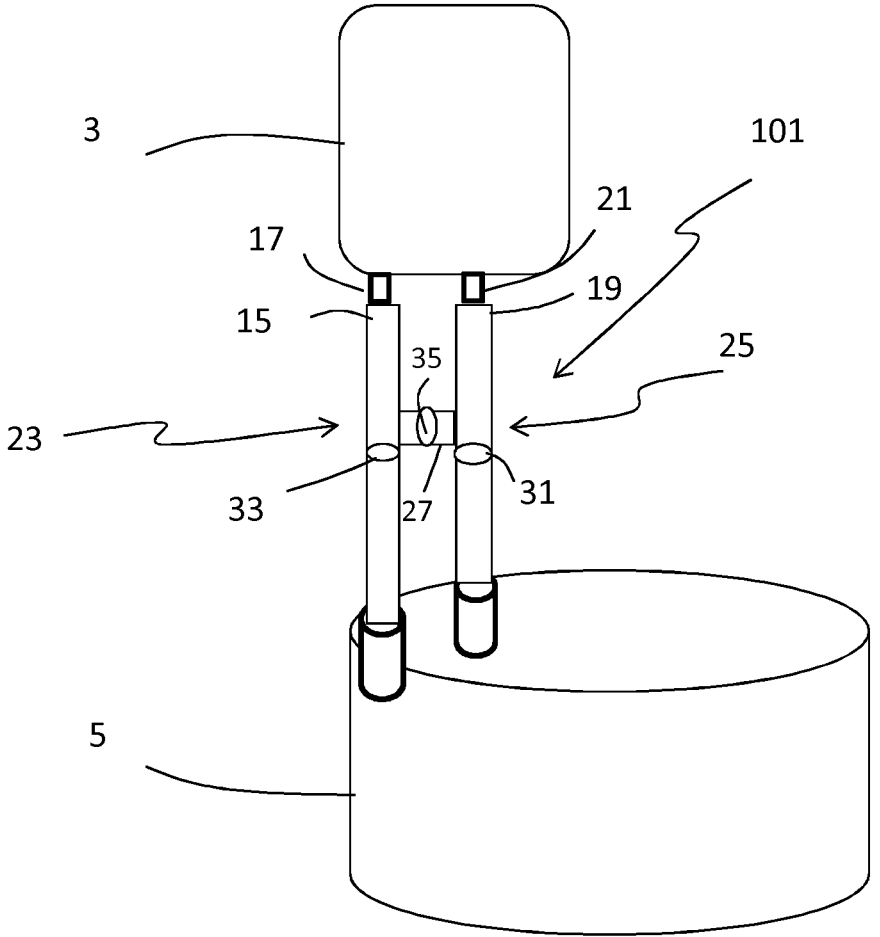
FIG. 1b shows schematically a connection device according to another embodiment of the invention connecting a separation system with a separation device.

FIG. 1b shows schematically a connection device 101 according to another embodiment of the invention connecting a separation system 3 with a separation device 5, such as for example a chromatography system 3 with a chromatography column 5. Many details are the same as in the embodiment described above in relation to FIG. 1a and are also given the same reference numbers and will not be described in detail again. The difference in this embodiment is that only one bypass valve 35 is provided in the bypass fluid path 27.

For both embodiments as described in relation to FIG. 1a and 1b the at least one bypass valve 35, 35a, 35b can be for example of diaphragm type. The inlet and outlet valves 31, 33 could also be of diaphragm type. In another embodiment, bypass valves 35, 35a, 35b and/or inlet and outlet valves 31, 33 could be provided as rotary valves. In rotary valve embodiments, multiple valve ports and functions could be integrated into one or multiple valve bodies. For example, the rotation of the valve could open bypass line 27 by opening valve(s) 35 and at the same time close off the bed by closing valves 31, 33 and vice versa. Several other combinations of opening and/or closing flow paths by rotation of the at least one rotary valve are feasible.

In another embodiment, valves 31, 33 and/or 35, 35a, 35b could be of pinch valve type, where a flexible tubing is closed by pinching a flexible wall section and sealing off the internal of the tube.

The whole connection device 1 can be made from suitable disposable materials which are suitable for pre-sterilization, for example by gamma radiation and thereby be adapted to single use technology (SUT).

The connection device 1, 101 according to the invention can suitably be provided with aseptic connectors for connection to the separation device 5 and possibly also aseptic connectors for connection to the separation system 3. If the connection device 1, 101 is an integrated part of the separation device 5 it can suitably be provided with aseptic connectors for connection to the separation system 3. The connection device 1, 101 can suitably be pre-sterilized and the pre-packed separation device 5 to which it is connected is suitably also provided with aseptic connectors for connection to the connection device 1, 101. The separation device can be pre-sterilized or subjected to bio-burden control. Hereby for example a chromatography bed of a separation device does not need to be sanitized before a first use.

If the connection device 1, 101 also comprises aseptic connectors for connection to the separation system removal of air can be performed after the connection to the system via the bypass fluid path and furthermore there is no need for further sanitization of the chromatography bed or the connectors to the system before use.

Aseptic connections between the connection device 1, 101 and the system can be for example through aseptic connectors, for example ReadyMate, aseptic multi-connectors, for example a Lynx Multi-connector from Millipore or through welding. Thermoplastic tubing can also be connected (fused) by a welder (fuser) and hereby an aseptic connection can be provided. Weldable tubing may also be closed (sealed) and disconnected by a sealer (heat sealer). However, connection of two tubing by welding and/or disconnecting a tube by sealing typically requires the use of thermoplastic tubing which are not reinforced (no braiding reinforcement). The use of non-reinforced tubing may limit the operating pressure range and use of the columns, connection devices and systems as non-reinforced tubing is typically not capable to withstand operating pressures larger than 1 bar and typical operating pressures for pre-packed chromatography columns in biopharmaceutical manufacturing may be in range of up to 4 to 6 bar. In order to enable operating pressures of several bars, weldable non reinforced tubing may therefore be supported by a rigid exoskeleton or shell, which can be fitted to the welded tubing for withstanding high pressures after a welding operation has been performed. Hereby a shell is provided around the tubing that is capable of withstanding the desired operating pressures. Such a shell could be adjustable in length, for example by a telescope function or by segments that can be engaged and applied to variable length to adjust to differences in tubing length that may result for repeated welding operations when disconnecting and re-connecting the tubing and the column. Hereby the weld position of a connection between two tubing can be provided with a skeleton and hereby high fluid pressures can be withstand even though unreinforced tubing are used for the part of the tubing where connections are provided.

Said inlet valve 31, said outlet valve 33 and said at least one bypass valve 35, 35*a*, 35*b* can be manually controllable into open and closed states. If the valves for example are diaphragm valves an actuator can be controlled manually for example by a screw having one open and one closed state. Diaphragm valves comprise a flexible diaphragm (or a membrane) which is displaced in between an open and closed valve position, the latter typically accommodated by moving the diaphragm (membrane) to a valve seat and thereby closing of the fluid flow. In one embodiment of the invention the connection device 1 comprises at least one monitoring device 51 (only shown in FIG. 1*a* but also applicable in FIG. 1*b*) which is connected to the inlet valve 31, the outlet valve 33 and/or to the at least one bypass valve 35, 35*a*, 35*b* and which monitoring device 51 shows the states of the inlet valve, the outlet valve and the at least one bypass valve. Hereby it would be easy to see from outside if the separation device is connected or bypassed. The connection device 1 can further comprise at least one sensor 53 (only shown in FIG. 1*a* but also applicable in FIG. 1*b*) arranged in the connection device for detecting an open and/or closed state of at least one of the inlet valve 31, the outlet valve 33 or the at least one bypass valve 35, 35*a*, 35*b*.

In another embodiment, the monitoring device 51 may provide visual, audible or haptic feedback to the operator.

In one embodiment of the invention the connection device 1 comprises a combination control device 55 (only shown in FIG. 1*a* but also applicable in FIG. 1*b*) which is connected to both the inlet valve 31, the outlet valve 33 and to the at least one bypass valve 35, 35*a*, 35*b* and which in a first position controls the inlet valve 31 and the outlet valve 33 to be in open states and the at least one bypass valve 35, 35*a*, 35*b* to be in a closed state and which in a second position controls the inlet valve 31 and the outlet valve 33 to be in closed states and the at least one bypass valve 35, 35*a*, 35*b* to be in an open state. Hereby, a connection device which is easy to control is achieved.

Control device 55 may be provided as mechanical, electronic or other solutions that prescribe dependencies between valve positions, accommodate simultaneous actuation of multiple valves through combined actuation with few operator or control system actions such as turning a lever, rotating a knob or engaging a system control element.

Control device 55 may further or solely provide features for monitoring valve position, actuation and operator interaction (monitoring device 51). Sensing capabilities may output read signals by wired or wireless connections to a control system interfaced with the separation system or a high level control and/or monitoring system.

Control device 55 may be embodied as a stand-alone device or integrated with a control and/or monitoring system on unit operation level (e.g. chromatography system) or factory level (e.g. Manufacturing execution system, MES).

Figure 2A:
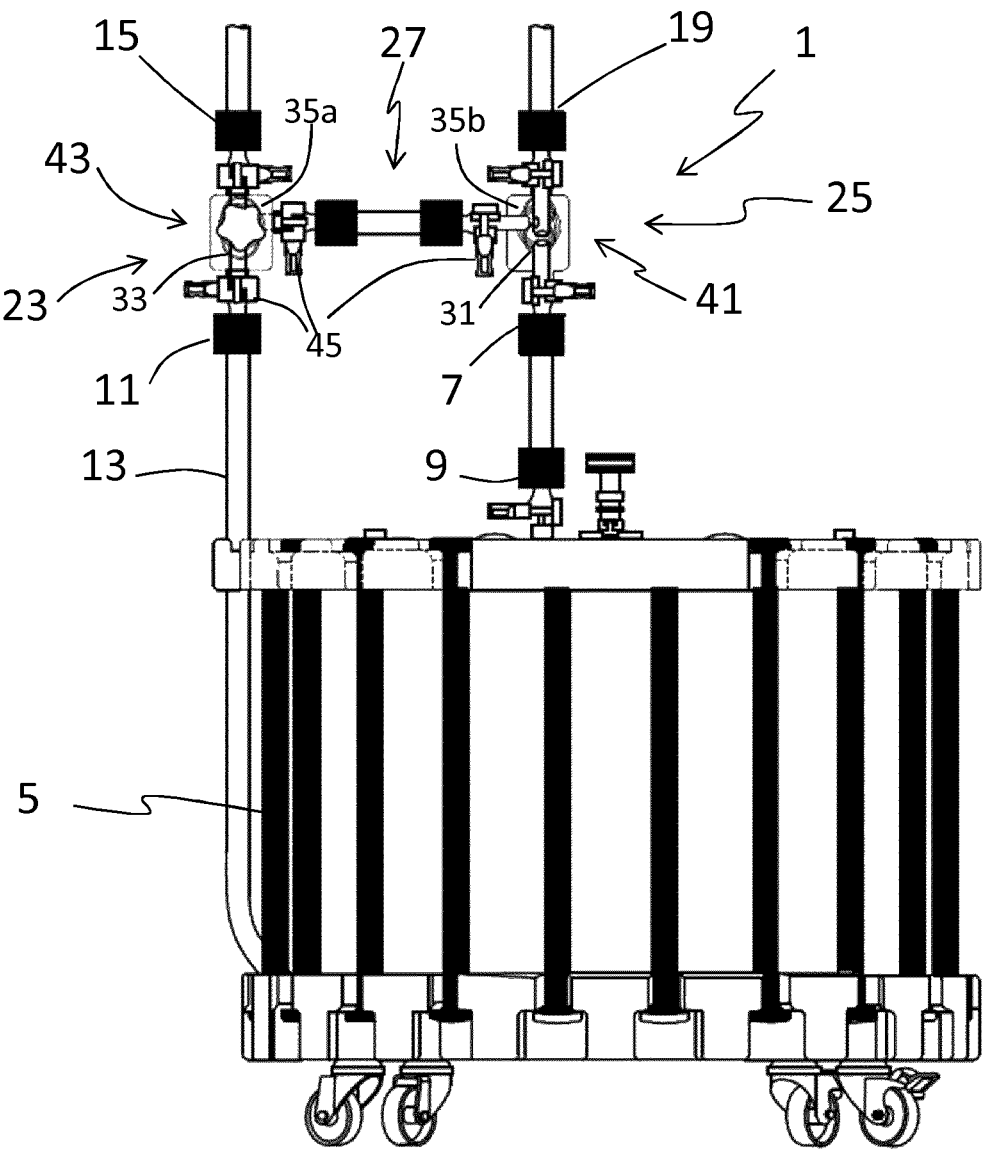
FIG. 2a shows schematically a connection device according to one embodiment of the invention connected to a separation device.

FIG. 2*a* shows schematically a connection device 1 according to one embodiment of the invention connected to a separation device 5, which in this example is a chromatography column 5. In this example the inlet 9 of the separation device is provided at an upper end unit of the separation device and the outlet 13 is provided at a lower end unit of the separation device. Flow through the column from the inlet to the outlet is called downflow mode. However the separation device could as well be used for upflow mode and nomenclature for inlet and outlet at column, connection device and system as well as flow directions in respective elements as well as the bypass line would be adapted accordingly. In that case the inlet is used as outlet and the outlet is used as inlet. Most of the details are the same as in the embodiment shown in FIG. 1*a* and are also given the same reference numbers and will not be described again. In this embodiment the connection device 1 comprises an inlet valve assembly part 41 comprising the inlet valve 31 and the second bypass valve 35*b* and an outlet valve assembly part 43 comprising the outlet valve 33 and the first bypass valve 35*b*, wherein said bypass fluid path 27 is provided between the first and the second bypass valves 35*a*, 35*b*. In this embodiment TC connections 45 are used for connecting the inlet valve assembly part 41 and the outlet valve assembly part 43 to the first, second and bypass fluid paths 23, 25, 27 in the connection device 1. However, other types of connections such as Barblock connection could instead be used. The inlet and outlet valve assembly parts 41, 43 are described in more detail with reference to FIGS. 2*b* and 2*c*. In FIG. 2*a* the inlet valve assembly part 41 is shown in cross section while the outlet valve assembly part 43 is not. These two parts 41, 43 can be identical.

Figure 2B:
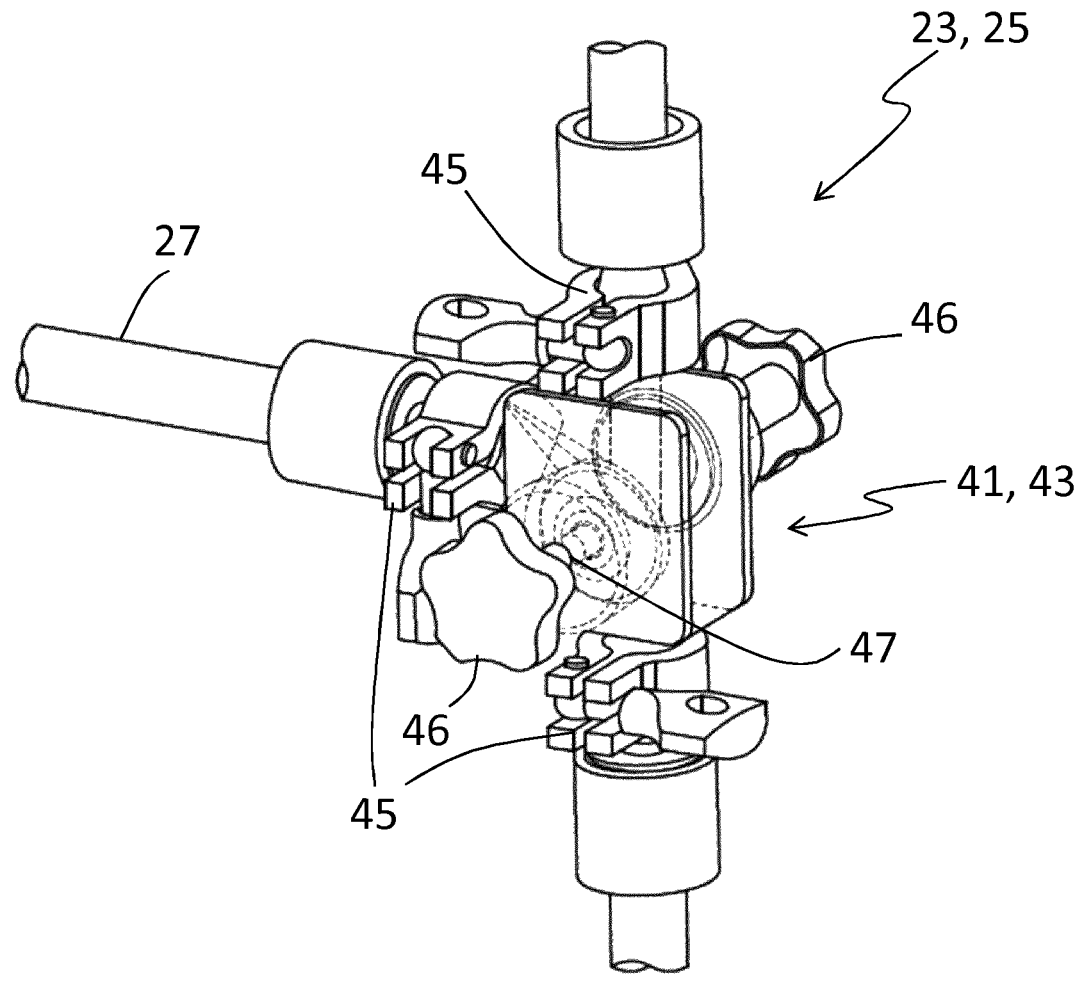

FIG. 2*b* is a perspective view of the inlet or outlet valve assembly part 41, 43 of the connection device 1 as shown in FIG. 2*a*. The inlet or outlet valve assembly part 41, 43 is in this embodiment connected to the bypass fluid path 27 by a TC connection 45 as described above. The inlet or outlet valve assembly part 41, 43 is furthermore also connected in either the first or the second fluid path 23, 25 by two TC connectors 45. The inlet or outlet valve assembly part 41, 43 comprises the inlet or outlet valve 31, 33 and the first or the second bypass valve 35*a*, 35*b*. In this embodiment all the valves 31, 33, 35*a*, 35*b* are diaphragm valves wherein a diaphragm will close or open the valves. An actuator 47 is provided for controlling the position of the diaphragms of each valve 31, 33, 35*a*, 35*b*. The actuators 47 are in this embodiment controlled by screws 46. However, other control members than screws could be provided for controlling the actuators 47.

Figure 2C:
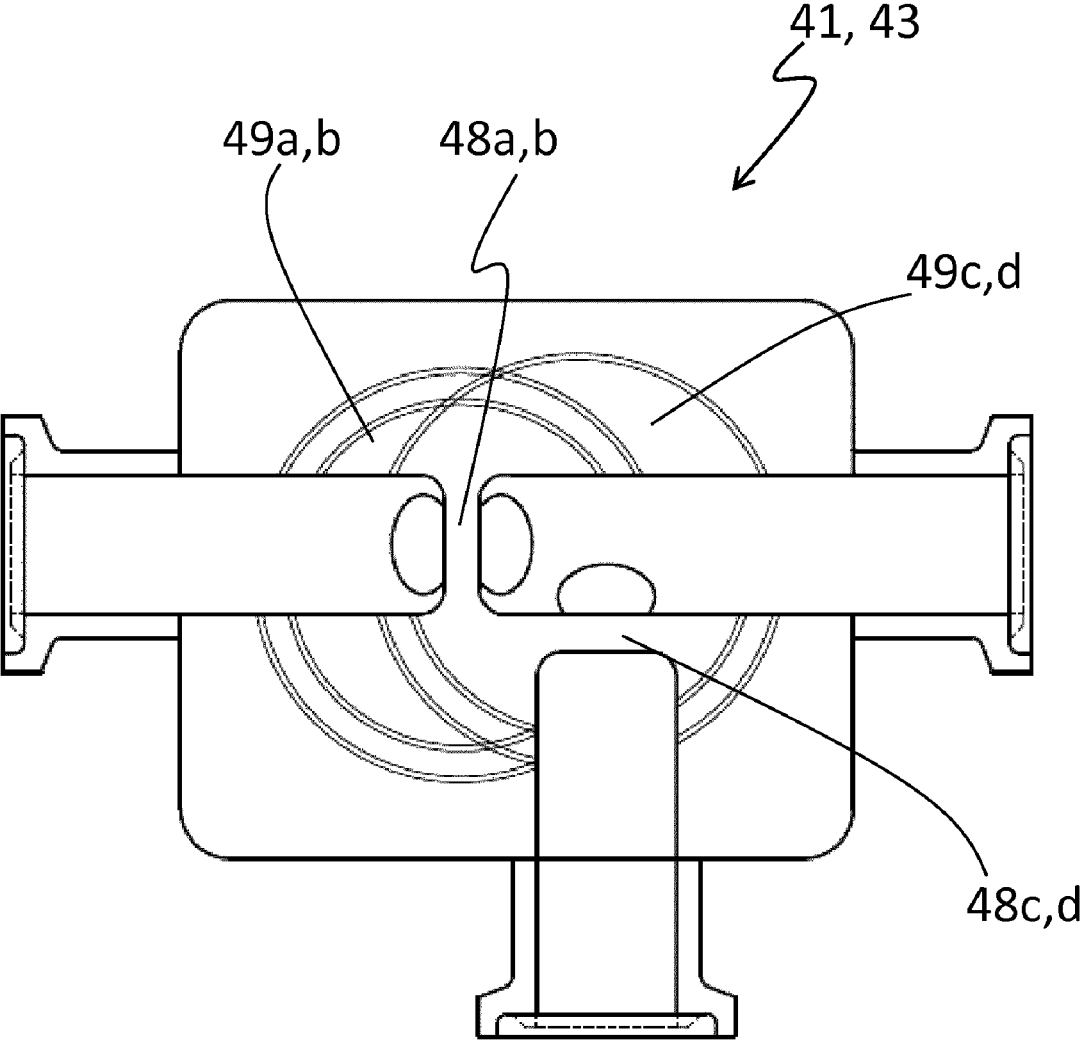

FIG. 2*c* is a cross section of the inlet or outlet valve assembly part 41, 43 of the same connection device 1 as shown in FIGS. 2*a* and 2*b*. An inlet or outlet valve seat 48*a*, 48*b* is provided in the inlet or outlet valve 31, 33 and an inlet or outlet diaphragm 49*a*, 49*b* is provided for closing or opening the inlet or outlet valve seat 48*a*, 48*b* for fluid flow. Furthermore a first or a second bypass valve seat 48*c*, 48*d* is provided in the first or second bypass valve 35*a*, 35*b* and a bypass diaphragm 49*c*, 49*d* is provided for closing or opening the first or second bypass valve seat 48*c*, 48*d* for fluid flow. The positions of the inlet, outlet and bypass diaphragms 49*a,b,c,d* are controlled by actuators 47 as described above.

According to the invention the inlet valve seat 48*a* and the second bypass valve seat 48*c* in the inlet valve assembly part 41 (and in the same way the outlet valve seat 48*b* and the first bypass valve seat 48d in the outlet valve assembly part 43) are provided close to each other for preventing dead legs, i.e. preventing fluid from getting trapped in the parts of the connection device 1 which are not used at the time. Close can mean for example a distance being less than three times a diameter of one of the fluid paths of the system, for example the bypass fluid path 27 as discussed above. In one embodiment of the invention the distance between the inlet valve seat 48a and the second bypass valve seat 48c (and the distance between the outlet valve seat and the first bypass valve seat in the outlet valve assembly part 43) is less than two times or even less than one time a diameter of a fluid path in the connection device 1.

Figure 3:
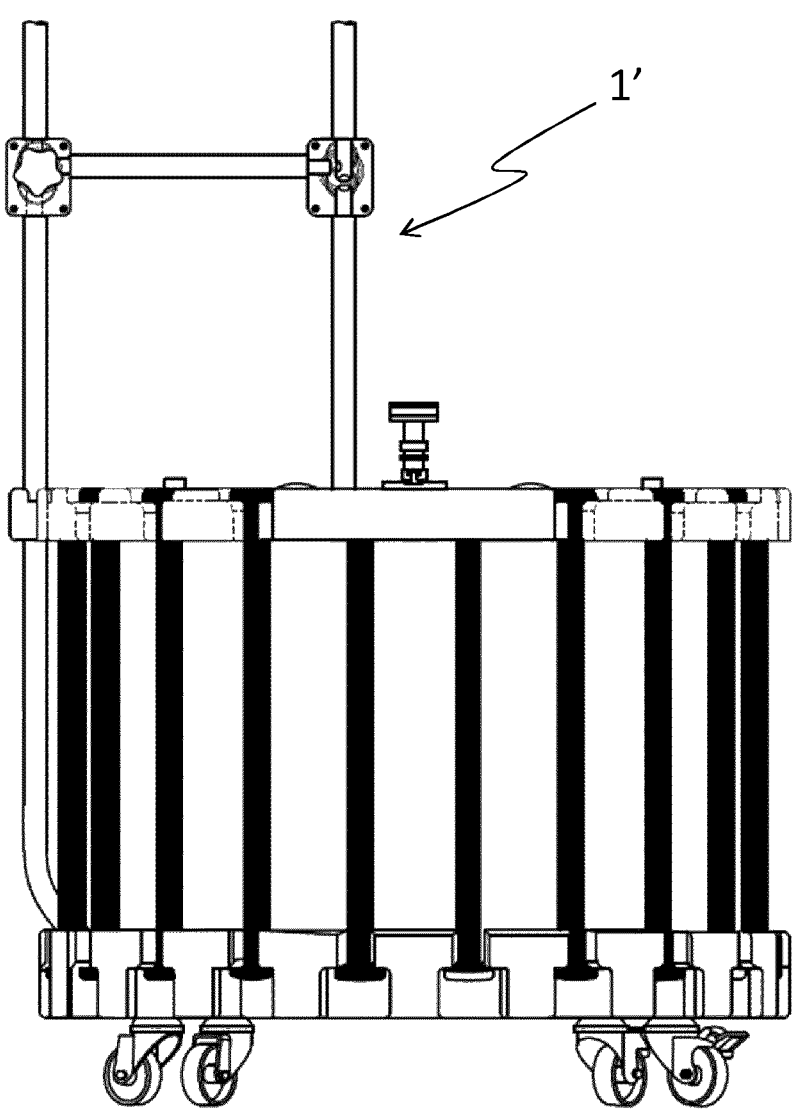
FIG. 3 shows schematically a connection device according to one embodiment of the invention connected to a separation device.

FIG. 3 shows schematically a connection device 1' according to one embodiment of the invention connected to a separation device 5. Many of the details in this embodiment are the same as described above for the embodiment shown in FIG. 1a and 2a and these details are given the same numbers and will not be described again. In this embodiment the connection device 1' is integrated with the separation device 5, i.e. mounted to the column during production at the factory.

Figure 4A:
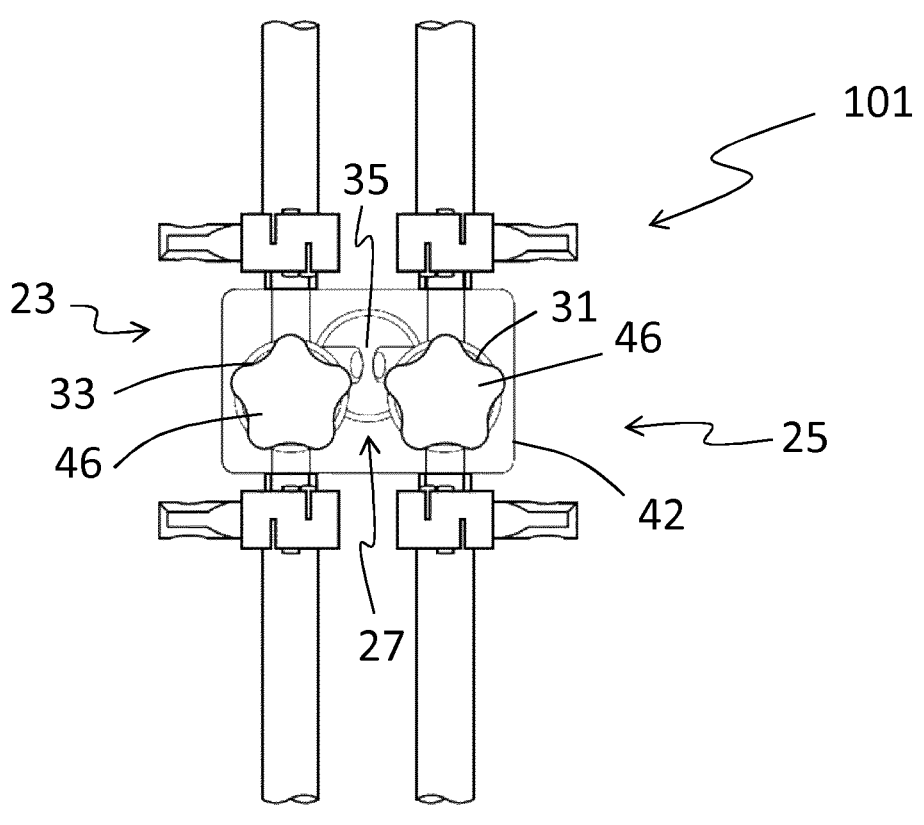
FIG. 4a shows schematically a connection device according to one embodiment of the invention.

FIG. 4a shows schematically a connection device 101 according to one embodiment of the invention. This connection device 101 is of the type as described in relation to FIG. 1b above, i.e. only one bypass valve 35 is provided. In this embodiment a valve assembly part 42 is provided which comprises all of the inlet valve 31, the outlet valve 33 and the bypass valve 35. Hereby the bypass fluid path 27 is only provided within the valve assembly part 42 itself.

Figure 4B:
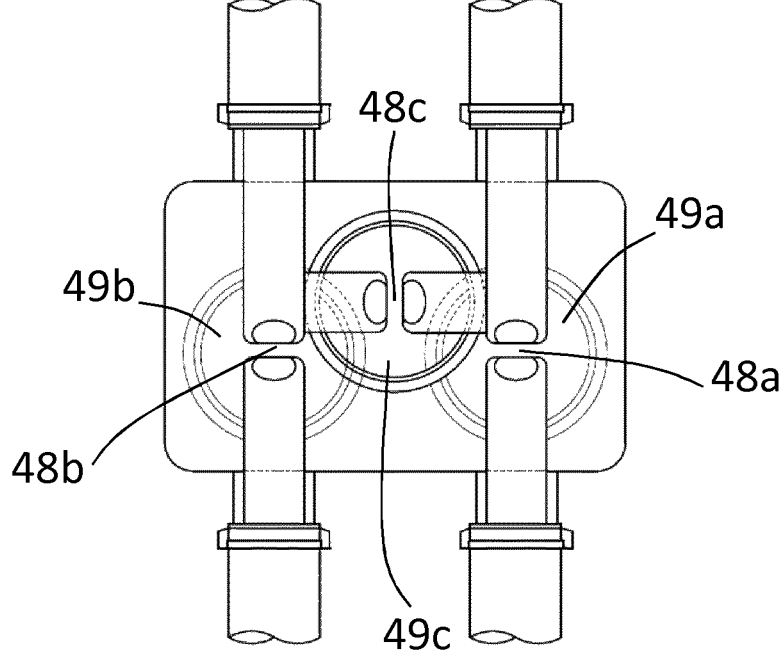
FIG. 4b shows schematically a connection device according to one embodiment of the invention in cross section.

FIG. 4b shows schematically a connection device 101 according to one embodiment of the invention in cross section. This could be the same connection device 101 as described in relation to FIG. 4a however in this embodiment the valve assembly part 42 is not connected to the first and second fluid paths 23, 25 by TC connections 45 as shown in FIG. 4a but instead by another type of integrated connector which may be of welded type. In this cross section an inlet valve seat 48a, an outlet valve seat 48b and a bypass valve seat 48c can be seen. An inlet diaphragm 49a is provided for closing or opening for fluid flow through the inlet valve seat 48a, an outlet diaphragm 49b is provided for closing or opening for fluid flow through the outlet valve seat 48b and a bypass diaphragm 49c is provided for closing or opening for fluid flow through the bypass valve seat 48c. As described above for the other embodiments the diaphragms can be controlled by actuators controlled by a suitable control device, such as a screw 46 as shown in FIG. 4a.

The valve assembly part 42 of the embodiment shown in FIGS. 4a and 4b and the inlet valve assembly part 41 and the outlet valve assembly part 43 of the embodiment as shown in FIGS. 2a-c and FIG. 3 could for example be connected with Barblock connectors (as shown in FIGS. 2a-b) or with TC connectors (as shown in certain connections in FIG. 2a as well as in FIG. 2c) or instead be integrated with the separation device 5. The bypass fluid path 27, the inlet and outlet valves 31, 33 and the bypass valves 35, 35a, 35b could also be integrated in the separation device 5, for example in an end unit of the column or possibly integrated in a separate unit which is mounted to the end unit of the column. The connectors can suitably be aseptic connectors. Alternatively, aseptic connections can be provided by welding as described above.

The connection device illustrated in the figures and shown above has particular utility for single use pre-packed separation device which needs to be compact in nature. In that case it is possible to combine the connection device into the separation device, for example as described below.

Figure 5A:
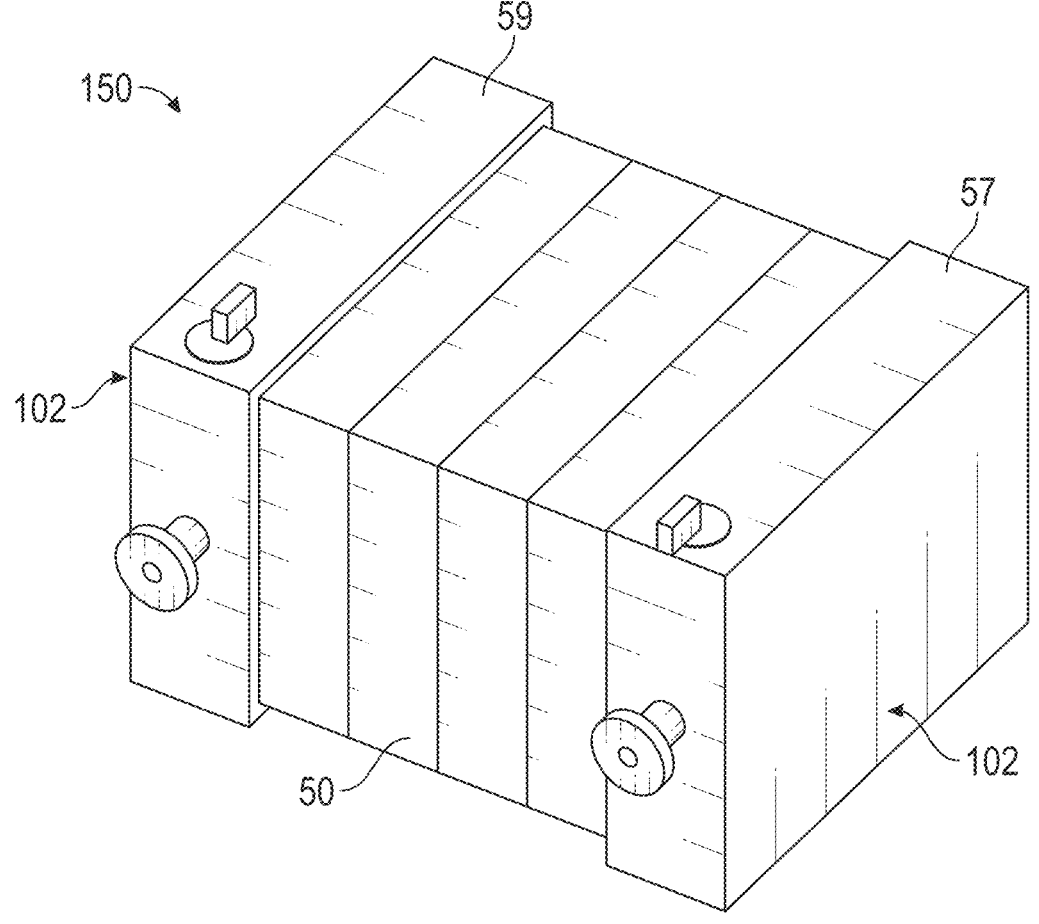
FIGS. 5a,5b,6a and 6b show further embodiments of a combined connection and separation device.
Figure 5B:
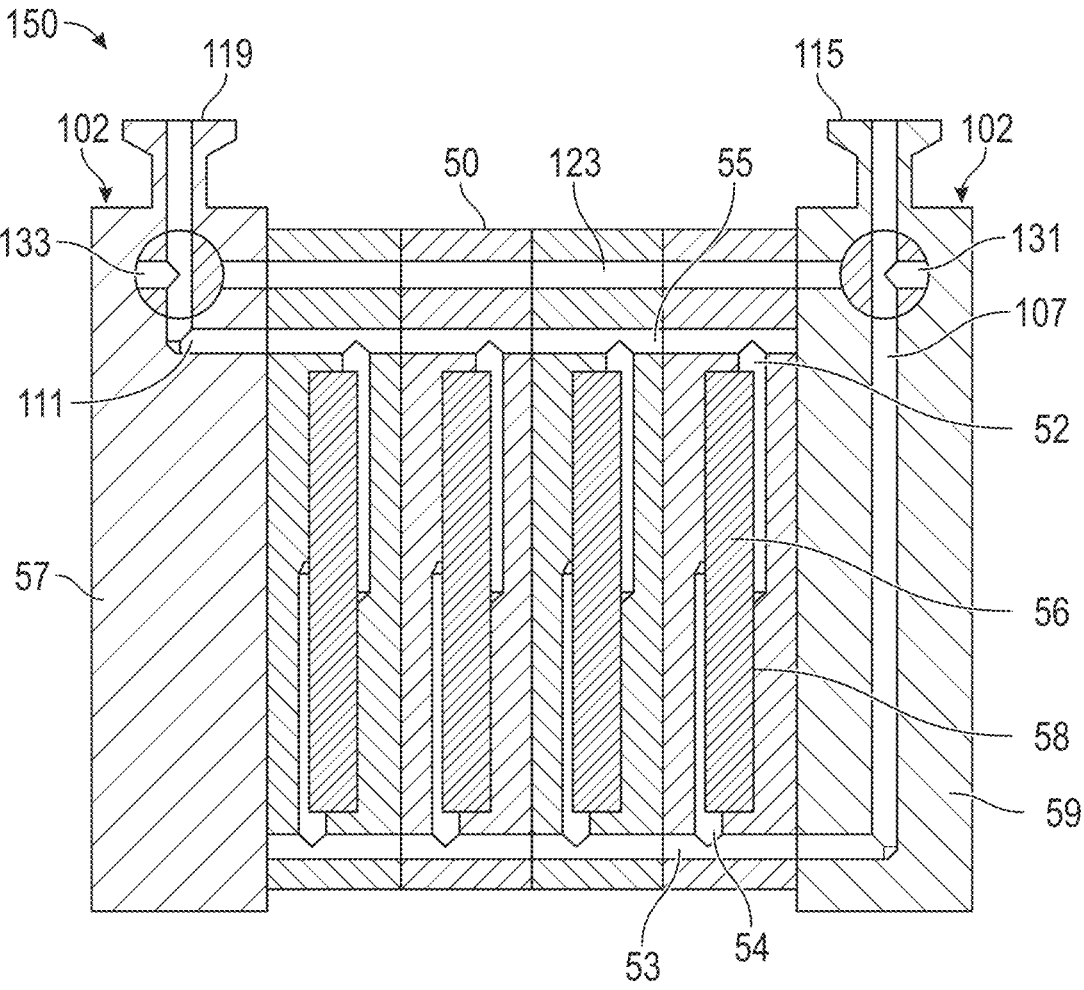
Figure 6A:
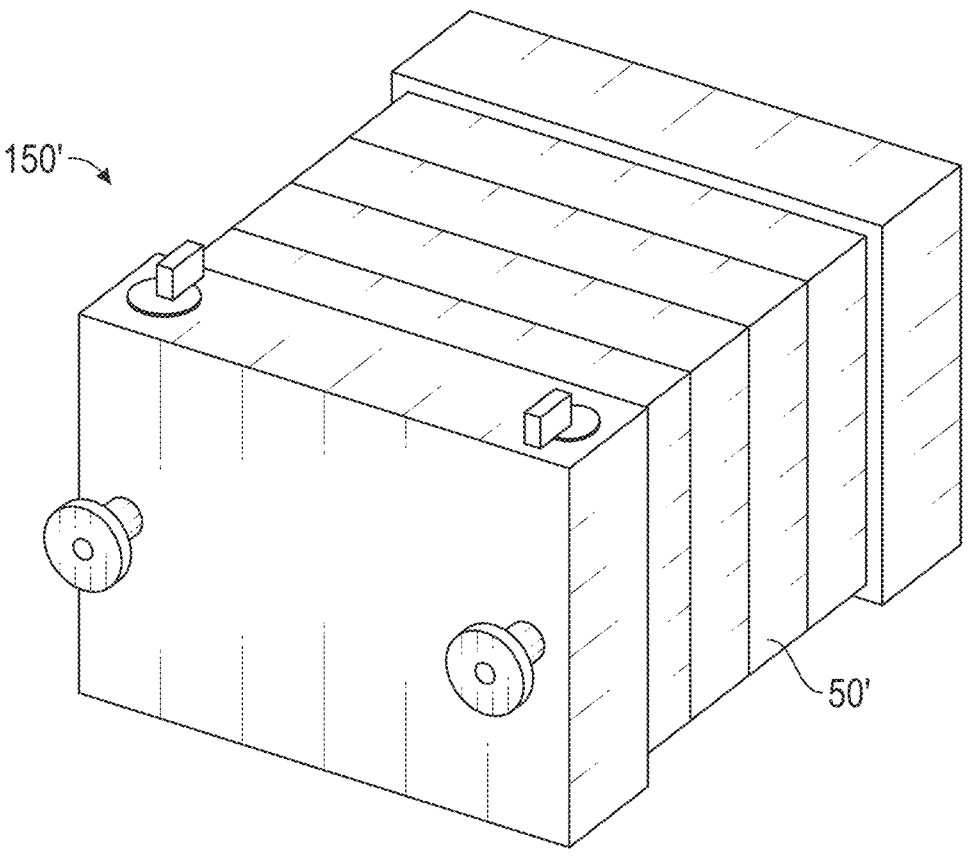
Figure 6B:
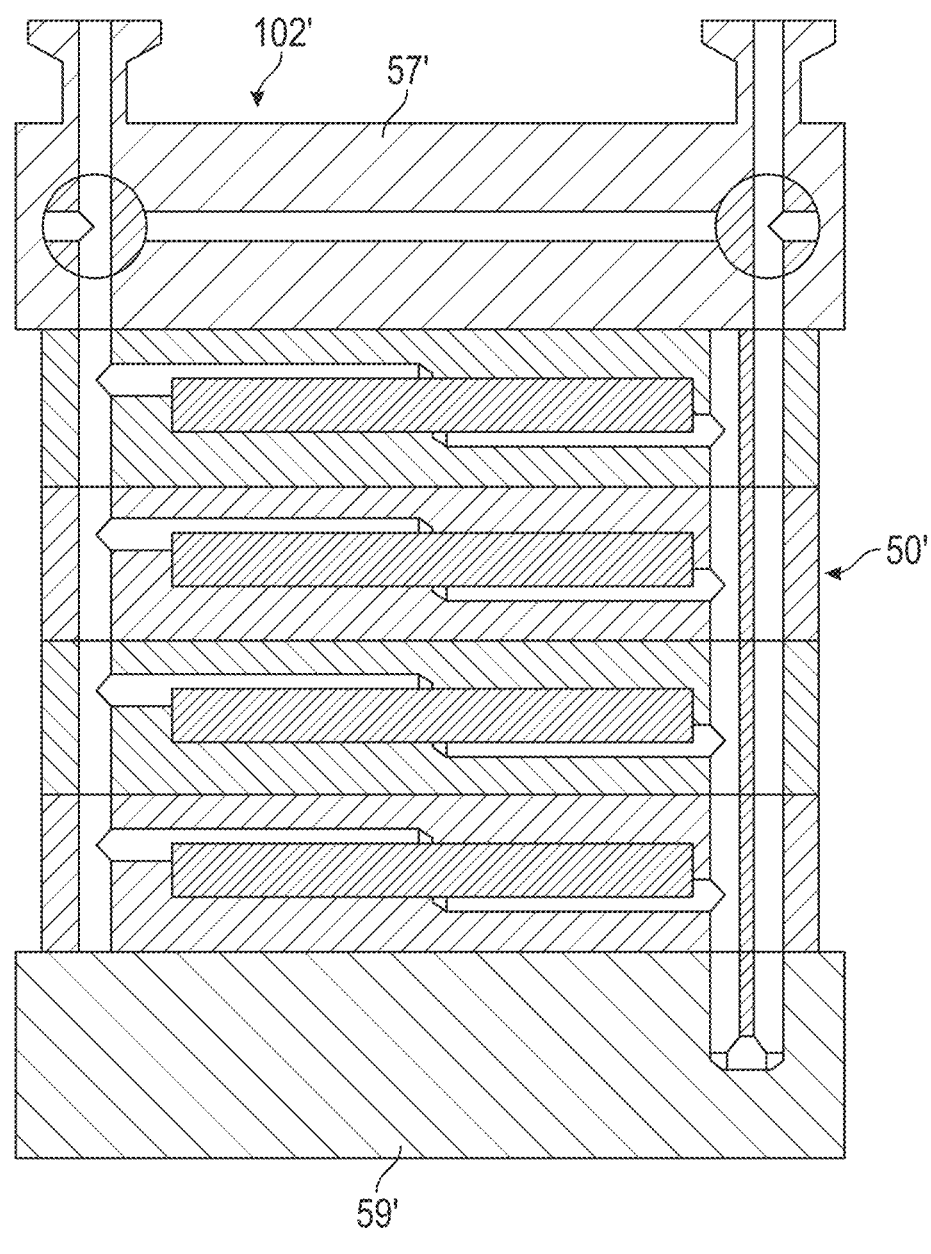

FIGS. 5a & 5b and, FIGS. 6a & 6b each show separation devices (150,105') incorporating a connection device (102, 102') similar to the devices 1 and 101 mentioned above except that in these figures, the inlet and outlet valves and fluidic connections such as the bypass are combined into the separation devices shown.

In more detail, FIG. 5a shows a separation device, 150 formed from stacked similar separation units 50, and an integrated connection device 102 formed by opposed headers 57 and 59. FIG. 5b shows a section through the device 150 shown in FIG. 5a, where each separation unit 50 has an inlet 52 an outlet 54 and separation material 56 in between a fluid distribution and collection fluid path 58 between the inlet 52 and outlet 54. The inlets and outlets are arranged to be co-terminal with each other to form a common inlet path 53 and a common outlet path 55.

The connection device 102 is formed by two headers 57 and 59. The headers 57 and 59 fluidically connect to the stacked separation units 50 via said common inlets and common outlets, thus being configured for connecting a separation system for example a system 3 described above. The connection device further comprises a three way inlet valve 131 and a three way outlet valve 133, each operable as described above such that the functionality of the valves is the same as the functionality of the valves 31 and 33 described above. In this case the valves are rotatable, by means of knobs on the outside of the respective headers, although other valve types could be used.

Thus, it can be seen that the connection device 102 has a separation device inlet connection 107 configured for connection to the separation device common inlet 53; a separation device outlet connection 111 configured for connection to a separation device common outlet 55; a separation system inlet connection 115 configured for connection to a separation system inlet (not shown); a separation system outlet connection 119 configured for connection to a separation system outlet (not shown); and a bypass fluid path 123 for connecting the separation system inlet connection 115 with the separation device outlet connection 111. By integrating bypass fluid path 123 into the separation units 50, a compact design with optimal holdup volume is achieved as the length of the bypass fluid path 123 is changing in proportion to the number of separation units installed in the separation device.

FIGS. 6a and 6b show a combined separation device and connection device 150' similar to the arrangement of FIGS. 5a and 5b respectively, with the result that the connection device 102' can be made as one header, and a foot piece 59' is used to close the lower end of the stack of units 50' and introduce fluids to the bottom of the stack, which avoids entrapped air. FIG. 6b shows the separation device and separation units arranged in a vertical position to illustrate that the separation device may be utilized in different orientations. Further, inlet and outlet connections of the separation device may be positioned in various alternative positions at the header(s) (not shown) and fluid conduits may be drawn differently than shown by the schematic illustrations. In practice, inlet and outlet connections as well as fluid conduits will be positioned such that fluid hold-up volume can be minimized and/or purging of air from the separation device will be facilitated in an optimal manner.

In the embodiments of FIGS. 5a and 6a, an integral bypass has been employed, although in practice it is possible to use two two-way valves as described above and utilize an external bypass. For an external bypass, the use of a flexible tube will allow for adaption of the separation device to a different number of separation units and thereby a variation in height of the stacked separation units. For each embodiment clamping force can be used to hold the stack of units together, and removal of the force allows the units to be removed, leaving in place, if necessary the headers 57,59 or header 57' and foot piece 59'. Sealing arrangements, like O-Rings or sealing surfaces provided by overmolding, are not shown here, but suitably applied to seal connections in between headers, separation units and separation system.

The connection device according to the invention can also be employed with other types of separation systems than chromatography systems, such as for example filtration systems, fluidized bed systems or similar.

The invention claimed is:

1. A connection device for connecting a biopharmaceutical separation system and a separation device, said connection device comprising:

a separation device inlet connection connected to a separation device inlet;

a separation device outlet connection connected to a separation device outlet;

a biopharmaceutical separation system inlet connection connected to a biopharmaceutical separation system inlet;

a biopharmaceutical separation system outlet connection connected to a biopharmaceutical separation system outlet;

a first fluid path connecting the biopharmaceutical separation system inlet connection with the separation device outlet connection and allowing fluid flow from the separation device outlet connection towards the biopharmaceutical separation system inlet connection;

a second fluid path connecting the biopharmaceutical separation system outlet connection with the separation device inlet connection and allowing fluid flow from the biopharmaceutical separation system outlet connection towards the separation device inlet connection;

a bypass fluid path connecting the biopharmaceutical separation system inlet connection with the biopharmaceutical separation system outlet connection and allowing fluid flow from the biopharmaceutical separation system outlet connection towards the biopharmaceutical separation system inlet connection;

an inlet valve provided in the second fluid path in connection with the separation device inlet connection, said inlet valve being operable to provide an open state allowing fluid flow through the separation device inlet connection and a closed state preventing fluid flow through the separation device inlet connection;

an outlet valve provided in the first fluid path in connection with the separation device outlet connection, said outlet valve being operable to provide an open state allowing fluid flow out through the separation device outlet connection and a closed state preventing fluid flow through the separation device outlet connection; and at least one bypass valve provided in the bypass fluid path, said at least one bypass valve being operable to provide an open state allowing fluid flow through the bypass fluid path and a closed state preventing fluid flow through the bypass fluid path, wherein a fluid can be flowed from the biopharmaceutical separation system outlet connection, through the bypass fluid path to the biopharmaceutical separation system inlet connection while a connected separation device is bypassed when at least one of the inlet and outlet valves is provided in a closed state and the at least one bypass valve is provided in an open state;

wherein said at least one bypass valve is positioned in the bypass fluid path at a distance from the first and/or second fluid path of no more than 3 times a diameter of the first, the second and/or the bypass fluid path;

wherein the separation device is a chromatography column or a stack of chromatography units, and wherein the biopharmaceutical separation system is a chromatography system;

wherein the fluid paths are formed using pre-sterilized plastic tubing; and wherein the bypass fluid path is configured to remove air from the biopharmaceutical separation system without passing air through a chromatography bed of the separation device.

2. The connection device according to claim 1, wherein the at least one bypass valve is of diaphragm type.

3. The connection device according to claim 1, wherein said inlet and outlet valves are of diaphragm type.

4. The connection device according to claim 1, wherein the inlet and outlet valves are positioned at a distance from junctions in between the first and second fluid paths and the bypass fluid path, of no more than 3 times, or 2 times, or 1 times a diameter of the first, the second and/or the bypass fluid line.

5. The connection device according to claim 1, wherein the separation device inlet and outlet connections are provided with aseptic connectors.

6. The connection device according to claim 1, wherein the biopharmaceutical separation system inlet and outlet connections are provided with aseptic connectors.

7. The connection device according to claim 1, wherein said inlet valve, said outlet valve and said at least one bypass valve are manually controllable into open and closed states.

8. The connection device according to claim 1, wherein the connection device comprises at least one monitoring device which is connected to the inlet valve, the outlet valve and/or to the at least one bypass valve and which monitoring device shows the states of the inlet valve, the outlet valve and the at least one bypass valve.

9. The connection device according to claim 1, wherein the connection device further comprises at least one sensor arranged in the connection device for detecting an open and/or closed state of at least one of the inlet valve, the outlet valve or the at least one bypass valve.

10. The connection device according to claim 1, wherein the connection device comprises a combination control device which is connected to both the inlet valve, the outlet valve and to the at least one bypass valve and which in a first position controls the inlet valve and the outlet valve to be in open states and the at least one bypass valve to be in a closed state and which in a second position controls the inlet valve and the outlet valve to be in closed states and the at least one bypass valve to be in an open state.

11. The connection device according to claim 1, wherein the at least one bypass valve is a single bypass valve, and wherein said inlet valve said outlet valve and said single bypass valve are provided together in one valve assembly part.

12. The connection device according to claim 1, wherein the at least one bypass valve includes a first bypass valve and a second bypass valve, and wherein the connection device comprises an inlet valve assembly part comprising the inlet valve and the second bypass valve and an outlet valve assembly part comprising the outlet valve and the first bypass valve, wherein said bypass fluid path is provided between the first and the second bypass valves.

13. The separation device comprising a separation device inlet and a separation device outlet and a connection device according to claim 1 connected to the separation device inlet and the separation device outlet.

14. The separation device according to claim 13, which separation device is pre-packed with a bed of chromatography media.

15. The separation device according to claim 13, wherein the connection device is connected to the separation device inlet and the separation device outlet through barbed connections, Barblock connections, TC connections or welded connections.

16. The separation device according to claim 13, wherein said connection device is integral with the separation device.

17. The separation device according to claim 16, wherein said bypass fluid path is provided integral with an end unit of the separation device or in the form of at least one header for said stack of units, said header including said at least one bypass valve.

18. The separation device according to claim 13, wherein said biopharmaceutical separation system inlet and outlet connections of the connection device are provided with aseptic connectors.

19. The biopharmaceutical separation system comprising a biopharmaceutical separation system inlet and a biopharmaceutical separation system outlet and a connection device according to claim 1 connected to the biopharmaceutical separation system inlet and the biopharmaceutical separation system outlet.

20. The biopharmaceutical separation system according to claim 18, wherein the connection device is connected to the biopharmaceutical separation system inlet and the biopharmaceutical separation system outlet through barbed connections, Barblock connections, TC connections or welded connections.

21. The biopharmaceutical separation system according to claim 18, wherein said connection device is integral with the separation system.

* * * * *